(12) United States Patent
Park (10) Patent No.: US 12,233,827 B2
(45) Date of Patent: Feb. 25, 2025

(54) ELECTRONIC BRAKE SYSTEM

(71) Applicant: HL MANDO CORPORATION, Gyeonggi-do (KR)

(72) Inventor: Jong Young Park, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 531 days.

(21) Appl. No.: 17/438,372

(22) PCT Filed: Mar. 11, 2020

(86) PCT No.: PCT/KR2020/003382
§ 371 (c)(1),
(2) Date: Sep. 10, 2021

(87) PCT Pub. No.: WO2020/184976
PCT Pub. Date: Sep. 17, 2020

(65) Prior Publication Data
US 2022/0153250 A1  May 19, 2022

(30) Foreign Application Priority Data

Mar. 11, 2019  (KR) .......................... 10-2019-0027655

(51) Int. Cl.
*B60T 13/68* (2006.01)
*B60T 7/04* (2006.01)
(Continued)

(52) U.S. Cl.
CPC ............ *B60T 13/686* (2013.01); *B60T 7/042* (2013.01); *B60T 8/4009* (2013.01);
(Continued)

(58) Field of Classification Search
CPC .......... B60T 7/12; B60T 7/042; B60T 13/148; B60T 13/686; B60T 13/745;
(Continued)

(56) References Cited

U.S. PATENT DOCUMENTS

| 4,753,490 A * | 6/1988 | Belart ..................... B60T 7/042 303/122.1 |
| 2006/0017319 A1* | 1/2006 | Kohl ..................... B60T 13/148 303/11 |

(Continued)

FOREIGN PATENT DOCUMENTS

| KR | 10-2010-0093069 | 8/2010 |
| KR | 10-1684132 | 12/2016 |

(Continued)

OTHER PUBLICATIONS

Office Action dated Jul. 19, 2023 for Korean Patent Application No. 10-2019-0027655 and its English translation from Global Dossier.
International Search Report for PCT/KR2020/003382 mailed on Jul. 8, 2020 and its English translation from WIPO (now published as WO 2020/184976).

(Continued)

*Primary Examiner* — Robert A. Siconolfi
*Assistant Examiner* — San M Aung
(74) *Attorney, Agent, or Firm* — WOMBLE BOND DICKINSON (US) LLP (57) ABSTRACT

Disclosed herein an electronic brake system includes a reservoir provided with spaces for storing oil, the spaces configured to be partitioned; a master cylinder connected to the reservoir, the master cylinder including first and second master chambers and first and second pistons provided in each master chamber, to discharge oil according to a pedal effort of a brake pedal; a hydraulic pressure supply device operated by an electrical signal to generate hydraulic pressure and including first and second pressure chambers and a hydraulic piston; a first hydraulic circuit configured to transmit hydraulic pressure discharged from the hydraulic pressure supply device to wheel cylinders of left front and right front wheels; and a second hydraulic circuit configured to transmit hydraulic pressure discharged from the hydraulic pressure supply device to wheel cylinders of left rear and right rear wheels; wherein hydraulic pressure returned from the wheel cylinders and hydraulic pressure returned from the (Continued)

second pressure chamber flow into the same reservoir chamber.

11 Claims, 4 Drawing Sheets

(51) Int. Cl.
  *B60T 8/40* (2006.01)
  *B60T 13/74* (2006.01)
(52) U.S. Cl.
  CPC .......... *B60T 8/4081* (2013.01); *B60T 13/745* (2013.01); *B60T 2270/10* (2013.01); *B60T 2270/404* (2013.01); *B60T 2270/82* (2013.01)
(58) Field of Classification Search
  CPC .... B60T 8/4009; B60T 8/4081; B60T 17/221; B60T 2270/10; B60T 2270/60; B60T 2270/82; B60T 2270/404
  USPC ........................................................ 303/9.61
  See application file for complete search history.

(56) References Cited

U.S. PATENT DOCUMENTS

| | | | | |
|---|---|---|---|---|
| 2011/0278113 | A1* | 11/2011 | Nishimura | ............ B60T 8/4059 188/106 P |
| 2016/0375886 | A1* | 12/2016 | Jung | ...................... B60T 13/745 303/15 |
| 2018/0162338 | A1* | 6/2018 | Irwan | ...................... B60T 8/171 |
| 2018/0162340 | A1 | 6/2018 | Irwan et al. | |
| 2018/0339692 | A1* | 11/2018 | Jeong | ................... B60T 13/686 |

FOREIGN PATENT DOCUMENTS

| | | |
|---|---|---|
| KR | 10-2018-0032605 | 3/2018 |
| KR | 10-2018-0128191 | 12/2018 |

OTHER PUBLICATIONS

Written Opinion of the International Searching Authority for PCT/KR2020/003382 mailed on Jul. 8, 2020 and its English translation by Google Translate (now published as WO 2020/184976).

* cited by examiner

ELECTRONIC BRAKE SYSTEM

CROSS-REFERENCE TO RELATED APPLICATIONS

This application is the U.S. National Stage of International Patent Application No. PCT/KR2020/003382 filed on Mar. 11, 2020, which claims the priority to Korean Patent Application No. 10-2019-0027655 filed in the Korean Intellectual Property Office on Mar. 11, 2019, the entire contents of which are incorporated herein by reference.

TECHNICAL FIELD

The disclosure relates to an electronic brake system, and more particularly, to an electronic brake system including a reservoir return hydraulic circuit and a control method thereof.

BACKGROUND ART

Generally, a reservoir is a tank for storing brake fluid, or hydraulic pressure oil of a power steering device.

In particular, a brake reservoir tank in which brake fluid is stored is located above a master cylinder to store the brake fluid supplied to the master cylinder, detect a residual amount of the brake fluid, and operate a warning light to warn a driver.

Conventionally, a brake system in which oil flowing out of a master cylinder is directly transmitted to wheel cylinders to generate braking force has been used. However, recently, an electronic brake system that separately includes a hydraulic pressure supply device provided with a pump capable of supplying hydraulic pressure to wheel cylinders is used. The above hydraulic pressure supply device may generate braking force by operating by an electrical signal and delivering oil to the wheel cylinders.

Such an electronic brake system may be used, for example, as an anti-lock brake system (ABS) that prevents a wheel slippage during braking, a brake traction control system (BTCS) that prevents a slipping of a driving wheel during sudden unintended acceleration or sudden acceleration of a vehicle, an electronic stability control system (ESC) that maintains a traveling condition of a vehicle stably by controlling brake fluid pressure by combining the ABS and the BTCS.

On the other hand, a regenerative braking system refers to a system that generates electric power by driving a generator when a vehicle has sufficient power to run due to inertia. Such a regenerative braking system is generally operated as one system interworked with a brake.

The most important role in a regenerative braking system is a brake. Energy is regenerated during regenerative braking in which a motor operates as a generator, but there is a limit to realizing braking force desired by a driver only with the regenerative braking. Therefore, a study for regenerative brake cooperative control brake system using an integrated brake controller that generates braking force with a hydraulic brake and a hydraulic pressure supply device has been ongoing.

However, when a leak occurs in an integrated electronic brake system including a front wheel and a rear wheel independent regenerative braking system, the desired braking force may not be generated and the ABS may not operate.

DISCLOSURE

Technical Problem

The disclosure provides an electronic brake system capable of connecting an internal chamber of a reservoir and a hydraulic circuit in order to generate a required amount of braking force and implement the ABS mode even when a leak occurs in front and rear wheels independent regenerative braking system.

Technical Solution

In accordance with an aspect of the disclosure, an electronic brake system includes a reservoir provided with spaces for storing oil, the spaces configured to be partitioned; a master cylinder connected to the reservoir, the master cylinder including first and second master chambers and first and second pistons provided in each master chamber, to discharge oil according to a pedal effort of a brake pedal; a hydraulic pressure supply device operated by an electrical signal to generate hydraulic pressure and including first and second pressure chambers and a hydraulic piston; a first hydraulic circuit configured to transmit hydraulic pressure discharged from the hydraulic pressure supply device to wheel cylinders of left front and right front wheels; and a second hydraulic circuit configured to transmit hydraulic pressure discharged from the hydraulic pressure supply device to wheel cylinders of left rear and right rear wheels; wherein hydraulic pressure returned from the wheel cylinders and hydraulic pressure returned from the second pressure chamber flow into the same reservoir chamber.

The reservoir may include a first reservoir chamber connected to supply the oil to the first master chamber, a second reservoir chamber connected to supply the oil to the hydraulic pressure supply device, and a third reservoir connected to supply the oil to the second master chamber.

The hydraulic pressure returned from the wheel cylinders may flow into the third reservoir chamber.

Further, when the hydraulic piston is moved backward and an ABS of the left rear wheel and the right rear wheel is operated, the hydraulic pressure returned from the wheel cylinders may be supplied from the third reservoir chamber to the second reservoir chamber.

Further, when a leak occurs in the first hydraulic circuit, the hydraulic piston may move to generate braking pressure.

Further, when a leak occurs in the second hydraulic circuit, the electronic brake system may enter a fallback mode.

The electronic brake system may further include a first backup flow path configured to directly transmit the hydraulic pressure from the master cylinder to the first hydraulic circuit, and a second backup flow path configured to directly transmit the hydraulic pressure from the master cylinder to the second hydraulic circuit.

Further, when a leak occurs in second hydraulic circuit, the hydraulic pressure generated in the master cylinder may be transmitted to the left front wheel and the right front wheel through the first backup flow path.

The electronic brake system may further include a first cut valve of a normal closed type installed in the first backup flow path and a second cut valve of a normal closed type installed in the second backup flow path; wherein when a leak occurs in the second hydraulic circuit, the electronic brake system opens the first cut valve.

The electronic brake system may be configured to perform independent regenerative braking of the first hydraulic circuit or the second hydraulic circuit.

Advantageous Effects

In an embodiment of the disclosure, by separately providing a reservoir chamber connected to the master cylinder and a reservoir chamber in which hydraulic pressure is introduced from the hydraulic pressure supply device to the master cylinder, the required braking force even when a leak occurs in the independent regenerative braking system for front and rear wheels may be secured.

Furthermore, by separately providing the reservoir chamber connected to the master cylinder and the reservoir chamber in which hydraulic pressure is introduced from the hydraulic pressure supply device to the master cylinder, the ABS may be operated even when a leak occurs in the independent regenerative braking system for front and rear wheels.

MODES OF THE INVENTION

Hereinafter, embodiments of the disclosure will be described in detail with reference to the accompanying drawings. The embodiments described below are provided by way of example so that those skilled in the art can fully understand the spirit of the present disclosure. The disclosure is not limited to the embodiments described below, but may be embodied in other forms. In order to clearly illustrate the disclosure, parts not related to the description are omitted from the drawings. In the drawings, the width, length, thickness, etc. of components may be exaggerated for convenience. Like reference numerals designate like elements throughout the specification.

Figure 1:
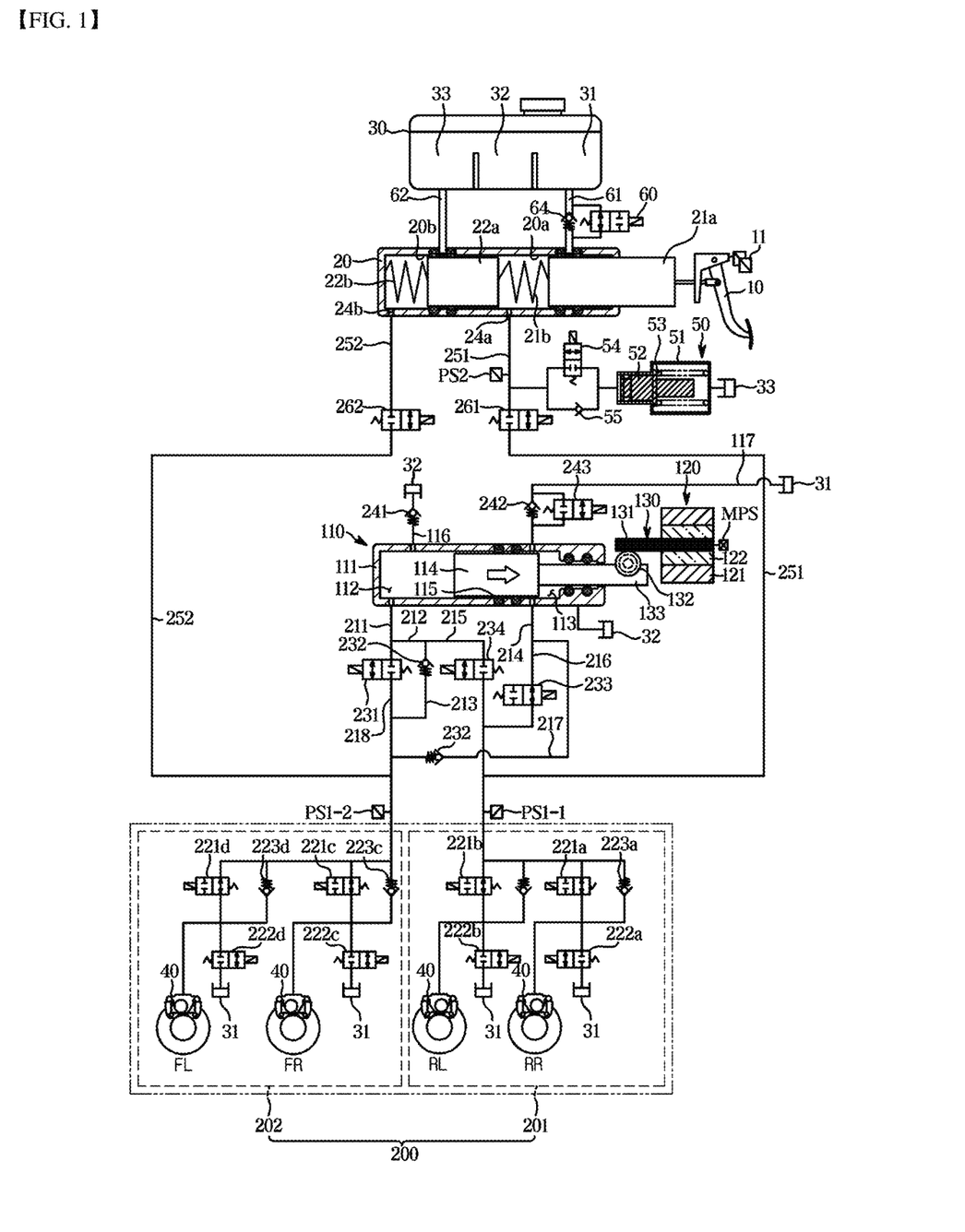
FIG. 1 is a hydraulic circuit diagram illustrating a non-braking state of an electronic brake system according to an embodiment.

FIG. 1 is a hydraulic circuit diagram illustrating a non-braking state of an electronic brake system performing regenerative braking according to an embodiment of the disclosure. Referring to the drawings, an electronic brake system 1 generally includes a master cylinder 20 that generates hydraulic pressure, a reservoir 30 coupled to an upper portion of the master cylinder 20 to store oil, an input rod 12 the presses the master cylinder 20 according to a pedal effort of a brake pedal 10, a wheel cylinder 40 that performs braking each wheel by being transmitted hydraulic pressure, a pedal displacement sensor 11 that detects a displacement of the brake pedal 10, and a simulation device 50 that provides a reaction force according to the pedal effort of the brake pedal 10.

The master cylinder 20 may be configured to have at least one chamber to generate hydraulic pressure. For example, the master cylinder 20 may include a first master chamber 20a and a second master chamber 20b.

A first piston 21a connected to the input rod 12 is provided in the first master chamber 20a, and a second piston 22a is provided in the second master chamber 20b. Furthermore, the first master chamber 20a communicates with a first hydraulic port 24a so that oil flows in and out, and the second master chamber 20b communicates with the second hydraulic port 24b so that oil flows in and out. For example, the first hydraulic port 24a may be connected to a first backup flow path 251, and the second hydraulic port 24b may be connected to a second backup flow path 252.

The master cylinder 20 has two master chambers 20a and 20b to ensure safety in case of a failure. For example, one master chamber 20a of the two master chambers 20a and 20b may be connected to a right rear wheel RR and a left rear wheel RL of a vehicle through the first backup flow path 251, and the other master chamber 20b may be connected to a right front wheel FR and a left front wheel FL through the second backup flow path 252.

A first spring 21b may be provided between the first piston 21a and the second piston 22a of the master cylinder 20, and a second spring 22b may be provided between an end of the second piston 22a and the master cylinder 20.

The first spring 21b and the second spring 22b are compressed by the first piston 21a and the second piston 22a that move as the displacement of the brake pedal 10 changes, and the elastic force thereof is stored. When the force pushing the first piston 21a is smaller than the elastic force, the first and second pistons 21a and 22a are pushed and returned to their original state by using the restoring elastic force stored in the first spring 21b and the second spring 22b.

The input rod 12 for pressing the first piston 21a of the master cylinder 20 may be in close contact with the first piston 21a. In other words, a gap may not exist between the master cylinder 20 and the input rod 12. Accordingly, when the brake pedal 10 is depressed, the master cylinder 20 may be directly pressed without a pedal invalid stroke section.

Furthermore, the first master chamber 20a may be connected to the reservoir 30 through a first reservoir flow path 61, and the second master chamber 20b may be connected to the reservoir 30 through a second reservoir flow path 62.

Furthermore, A check valve 64 may be provided in the first reservoir flow path 61 so that allows the flow of oil flowing from the reservoir 30 to the first master chamber 20a and block the flow of oil flowing into the reservoir 30 from the first master chamber 20a.

Front and rear sides of the check valve 64 of the first reservoir flow path 61 may be connected by a bypass flow path 63, and an inspection valve 60 may be provided in the bypass flow path 63.

The inspection valve 60 may be provided as a two-way control valve for controlling the flow of oil between the reservoir 30 and the master cylinder 20. The inspection valve 60 may be provided as a normal open type solenoid valve that is normally open and operates to be closed the valve when a closing signal is received from the electronic control unit (ECU) 510. The inspection valve 60 is for detecting a leak of a simulator valve 54, and an inspection mode may be executed under a predetermined condition through the ECU 510 while traveling or stopping.

On the other hand, the reservoir 30 may include three reservoir chambers 31, 32, and 33. For example, the three reservoir chambers 31, 32, and 33 may be arranged side by side in a row.

The first reservoir chamber 31 may be connected to the first master chamber 20a of the master cylinder 20, the wheel cylinders 40, and a second pressure chamber 113 of a hydraulic pressure providing unit 110, as shown in FIG. 1. In other words, the first reservoir chamber 31 may be connected to the first master chamber 20a through the first reservoir flow path 61, and also connected to a first hydraulic circuit 201 in which two wheel cylinders RL and RR are arranged among the four wheel cylinders 40 and a second hydraulic circuit in which the other two wheel cylinders FL and FR are arranged. Furthermore, the first reservoir chamber 31 may allow oil to flow into the second pressure chamber 113 of the hydraulic pressure providing unit 110.

The connection between the first reservoir chamber 31 and the first master chamber 20a may be controlled by the check valve 64 and the inspection valve 60, and the connection of the first reservoir chamber 31 and the second pressure chamber 113 of the hydraulic pressure supply device may be controlled by a second dump valve 242 and a fifth dump valve 245. The second dump valve 242 may be provided as a check valve that allows the flow of oil from the reservoir 30 to the second pressure chamber 113, but block the flow of oil from the second pressure chamber 113 to the reservoir 30. The fifth dump valve 245 may be controlled by a solenoid valve type to control the bidirectional flow of oil between the second pressure chamber 113 and the reservoir 30. The connection between the first reservoir chamber 31 and the wheel cylinders 40 may be controlled by the first and second outlet valves 222a, 222b, 222c, and 222d.

The second reservoir chamber 32 may be connected to a hydraulic pressure supply device 100 to be described later. The second reservoir chamber 32 may be connected to the first pressure chamber 112 of the hydraulic pressure providing unit 110. More specifically, the second reservoir chamber 32 may be connected to the first pressure chamber 112 through a first dump flow path 116. The third reservoir chamber 33 may be connected to the second master chamber 20b of the master cylinder 20. In other words, the third reservoir chamber 33 may be connected to the second master chamber 20b through the second reservoir flow path 62.

On the other hand, the reservoir 30 may be provided by partitioning or separating the second reservoir chamber 32 connected to the hydraulic pressure supply device 100, and the first and third reservoir chambers 31 and 33 connected to the first and second master chambers 20a and 20b. This is because, assuring the reservoir chamber for supplying oil to the hydraulic supply device 100 and the reservoir chamber for supplying oil to the master chambers 20a and 20b are equally provided, when the reservoir 20 fails to properly supply oil to the hydraulic pressure supply device 100, oil may not be properly supplied to the master chambers 20a and 20b as well.

Accordingly, by separating the second reservoir chamber 32 and the first and third reservoir chambers 31 and 33, the reservoir 30 may normally supply oil to the first and second master chambers 20a and 20b so that emergency braking is performed in case of an emergency in which oil may not be properly supplied to the hydraulic supply device 100.

On the other hand, the simulation device 50 may be connected to the first backup flow path 251 to be described later to provide a reaction force according to the pedal effort of the brake pedal 10. By providing the reaction force that compensates for the pedal effort provided by a driver, the driver may finely adjust the braking force as intended.

As shown in FIG. 1, the simulation device 50 includes a pedal simulator having a simulation chamber 51 provided to store the oil flowing out from the first hydraulic port 24a of the master cylinder 20, a reaction force piston 52 provided in the simulation chamber 51, and a reaction force spring 53 elastically supporting the reaction force piston 52, and a simulator valve 54 connected to a front end of the simulation chamber 51.

The inside of the simulation chamber 51 is always filled with oil. Accordingly, when the simulation device 50 is operated, friction of the reaction force piston 52 is minimized, so that durability of the simulation device 50 is improved, and the inflow of foreign substances from the outside may be fundamentally blocked.

The reaction force piston 52 and the reaction force spring 53 are installed to have a displacement within a certain range in the simulation chamber 51 by the oil flowing into the simulation chamber 51.

The simulator valve 54 may connect the master cylinder 20 and a front end of the simulation chamber 51, and a rear end of the simulation chamber 51 may be connected to the reservoir 31. Accordingly, even when the reaction force piston 52 returns, oil flows in from the reservoir 31 so that the entire interior of the simulation chamber 51 may always be filled with oil.

The simulator valve 54 may be provided as a closed type solenoid valve that normally maintains a closed state. The simulator valve 54 is opened when the driver applies the pedal effort to the brake pedal 10 to deliver the oil in the simulation chamber 51 to the reservoir 31.

Furthermore, a simulator check valve 55 may be installed in parallel to the simulator valve 54. The simulator check valve 55 may ensure a quick return of the pressure of the pedal simulator when the pedal effort of the brake pedal 10 is released.

On the other hand, the electronic brake system 1 according to the embodiment may include a hydraulic pressure supply device that receives the driver's braking intention as an electrical signal from the pedal displacement sensor 11 that detects the displacement of the brake pedal 10 to operate mechanically, a hydraulic control unit 200 including first and second hydraulic circuits 201 and 202 that control the flow of hydraulic pressure transmitted to the wheel cylinders 40 provided on two wheels RR, RL, FR, and FL, respectively, a first cut valve 261 provided in the first backup flow path 251 connecting the first hydraulic port 24a of the master cylinder and the first hydraulic circuit 71 to control the flow of hydraulic pressure, a second cut valve 262 provided in the second backup flow path 252 connecting the second hydraulic port 24b of the master cylinder and the second hydraulic circuit 202 to control the flow of hydraulic pressure, and the ECU that controls the hydraulic pressure supply device 100 and the valves 54, 60, 221a, 221b, 221c, 221d, 222a, 222b, 222c, and 222d based on hydraulic pressure information and brake pedal displacement information.

The hydraulic pressure supply device 100 may include a hydraulic pressure providing unit 110 that provides pressure of oil transmitted to the wheel cylinders 40, a motor 120 that generates a rotational force by an electrical signal from the pedal displacement sensor 11, and a power conversion unit 130 that converts a rotational motion of the motor 120 into a linear motion to transmit to the hydraulic pressure providing unit 110. Herein, the hydraulic pressure providing unit 110 may be operated by the pressure provided from a high-pressure accumulator instead of a driving force supplied from the motor 120.

The hydraulic pressure providing unit 110 includes a cylinder block 111 in which a pressure chamber to receive and store oil is formed, a hydraulic piston 114 accommodated in the cylinder block 111, a sealing member 115, 115a, and 115b provided between the hydraulic piston 114 and the cylinder block 111 to seal the pressure chamber, and a drive shaft 133 connected to a rear end of the hydraulic piston 114 to deliver power output from the power conversion unit 130 to the hydraulic piston 114.

The pressure chamber may include a first pressure chamber 112 located in a front side of the hydraulic piston 114 (forward direction, left direction in the drawing), and a second pressure chamber 113 located in a rear side of the hydraulic piston 114 (backward direction, right direction in the drawing).

In other words, the first pressure chamber 112 is partitioned by the cylinder block 111 and a front end of the hydraulic piston 114, the volume of the first pressure chamber 112 is provided to vary according to movement of the hydraulic piston 114. The second pressure chamber 113 is partitioned by the cylinder block 111 and a rear end of the hydraulic piston 114, and the volume of the second pressure chamber 113 is provided to vary according to the movement of the hydraulic piston 114.

The first pressure chamber 112 is connected to a first hydraulic flow path 211 through a first communication hole 111a formed on the rear side of the cylinder block 111, and the second pressure chamber 113 is connected to a fourth hydraulic flow path 214 through a second communication hole 111b formed on the front side of the cylinder block 111.

The first hydraulic flow path 211 connects the first pressure chamber 112 and the first and second hydraulic circuits 201 and 202. Furthermore, the first hydraulic flow path 211 is branched into a seventh hydraulic flow path 218 communicated with the first hydraulic circuit 201 and a eighth hydraulic flow path 212, and the eighth hydraulic flow path 212 is branched into a second hydraulic flow path 215 and a third hydraulic flow path 213 communicating with the second hydraulic circuit 202. The fourth hydraulic flow path 214 connects the second pressure chamber 113 and the first and second hydraulic circuits 201 and 202. Furthermore, the fourth hydraulic flow path 214 is branched into a fifth hydraulic flow path 216 communicating with the first hydraulic circuit 201 and a sixth hydraulic flow path 217 communicating with the second hydraulic circuit 202.

The sealing member 115 includes a piston sealing member 115a provided between the hydraulic piston 114 and the cylinder block 111 to seal between the first pressure chamber 112 and the second pressure chamber 113, and a drive shaft sealing member 115b provided between the drive shaft 133 and the cylinder block 111 to seal the second pressure chamber 113 and an opening of the cylinder block 111. In other words, the hydraulic pressure of the first pressure chamber 112 generated by the forward or backward movement of the hydraulic piston 114 may be blocked by the piston sealing member 115a to transmit to the hydraulic flow paths 211 and 214 without leaking into the second pressure chamber 113. Furthermore, the hydraulic pressure of the second pressure chamber 113 generated by the forward or backward movement of the hydraulic piston 114 may be blocked by the drive shaft sealing member 115b so as not to leak into the cylinder block 111.

The first and second pressure chambers 112 and 113 are connected to the second reservoir chamber 32 or the first reservoir chamber 31 by the dump flow paths 116 and 117, respectively. Accordingly, the first and second pressure chambers 112 and 113 may be supplied and stored oil from the second reservoir chamber 32, or deliver oil in the first or second pressure chambers 112 and 113 to the second reservoir chamber 32, respectively.

For example, the first pressure chamber 112 may be connected to the first dump flow path 116 through a third communication hole 111c formed on the front side thereof, and the second pressure chamber 113 may be connected to the second dump flow path 117 through a fourth communication hole 111d formed on the rear side thereof. Referring back to FIG. 1, flow paths 211, 212, 213, 214, 215, 216, 217, and 218 connected to the first and second pressure chambers 112 and 113 and valves 231, 232, 233, 234, 235, 241, 242, 243, 244, and 245 will be described.

The second hydraulic flow path 212 may communicate with the first hydraulic circuit 201 and the second hydraulic circuit 202. Accordingly, hydraulic pressure may be transmitted to the second hydraulic circuit 202 by the advance of the hydraulic piston 114.

Furthermore, the electronic brake system 1 according to the embodiment may include a first control valve 232 provided in the third hydraulic flow path 213 to control the flow of oil. Furthermore, the electronic brake system 1 according to the embodiment may include a second control valve 231 provided in the seventh hydraulic flow path 218 to control the flow of oil.

In this case, the first control valve 232 may be provided as a check valve that allows only the flow of oil in a direction from the first pressure chamber 112 to the second hydraulic circuit 202 and blocks the flow of oil in the opposite direction.

Furthermore, the second control valve 231 may be provided as a closed type solenoid valve that normally maintains a closed state and operates to open the valve when an open signal is received from the ECU.

The eighth hydraulic flow path 212 is branched into the second hydraulic flow path 215 and the third hydraulic flow path 213 on the way, thereby communicating with both the first hydraulic circuit 201 and the second hydraulic circuit 202.

Furthermore, the electronic brake system 1 according to the embodiment may include a third control valve 234 provided in the second hydraulic flow path 215 to control the flow of oil. Moreover, the electronic brake system 1 may include a fourth control valve 233 provided in the fifth hydraulic circuit 216 to control the flow of oil. At this time, the third control valve 234 may be provided as a normal closed type solenoid valve that closed in a normal state and operates to open the valve when an open signal is received from the ECU, and the fourth control valve 233 may be provided as a normal open type solenoid valve that opened in a normal state and operates to be closed the valve when a closing signal is received from the ECU.

Furthermore, the electronic brake system 1 according to the embodiment may further include the first and second dump valves 241 and 242 provided in the first and second dump flow paths 116 and 117, respectively to control the flow of oil. In other words, the first dump valve 241 may be provided as a check valve that allows the flow of oil from the reservoir 30 to the first pressure chamber 112 and blocks the flow of oil from the first pressure chamber 112 to the reservoir 30, and the second dump valve 242 may be provided as a check valve that allows the flow of oil from the reservoir 30 to the second pressure chamber 113 and blocks the flow of oil from the second pressure chamber 113 to the reservoir 30.

The third dump valve 243 is provided in the form of a solenoid valve to control the bidirectional flow of oil between the second pressure chamber 113 and the reservoir 30. The third dump valve 243 may be provided as a normal closed type solenoid valve that closed in a normal state and operates to open the valve when an opening signal is received from the ECU.

The third dump valve 243 is to identify the origin of the hydraulic piston 114 accommodated in the cylinder block 111 of the hydraulic pressure providing unit 110. The third dump valve 243 is opened only before the initial driving of the hydraulic pressure supply device 100, and allows the ECU (not shown) to precisely control the stroke of the hydraulic piston 114 by grasping the position of the motor together with a position sensor of the motor 120 (not shown). The third dump valve 243 maintains a closed state during the operation of the hydraulic pressure supply device 100.

On the other hand, the hydraulic pressure providing unit 110 of the electronic brake system 1 according to the embodiment may operate in a double-acting manner. In other words, the hydraulic pressure generated in the first pressure chamber 112 as the hydraulic piston 114 moves forward is transmitted to the second hydraulic circuit 202 through the third hydraulic flow path 213 to act on the wheel cylinder 40s installed in the FR and FL.

Next, the motor 120 and the power conversion unit 130 of the hydraulic pressure supply device 100 will be described.

The motor 120 is a device for generating a rotational force by a signal output from the ECU, and may generate a rotational force in a forward or reverse direction. The rotation angular velocity and rotation angle of the motor 120 may be precisely controlled. The motor 120 is a well-known technology, so a detailed description thereof will be omitted.

The ECU includes the motor 120 and controls valves 54, 60, 221a, 221b, 221c, 221d, 222a, 222b, 222c, 222d, 245, 261, and 262 provided in the electronic brake system 1 of the disclosure to be described later. An operation in which a plurality of valves are controlled according to the displacement of the brake pedal 10 will be described later.

The driving force of the motor 120 generates displacement of the hydraulic piston 114 through the power conversion unit 130, and the hydraulic pressure generated while the hydraulic piston 114 slides within the pressure chamber is transmitted to the wheel cylinders 40 installed in each wheel RR, RL, FR, and FL through the hydraulic flow paths 211 and 214. The motor may employ a brushless motor including a stator 121 and a rotor 122.

The power conversion unit 130 is a device that converts a rotational force into a linear motion, and may include, for example, a worm shaft 131, a worm wheel 132, and the drive shaft 133.

The worm shaft 131 may be integrally formed with a rotating shaft of the motor 120, and a worm is formed on an outer circumferential surface thereof to engage the worm wheel 132 to rotate the worm wheel 132. The worm wheel 132 is connected to be engaged the drive shaft 133 to linearly move the drive shaft 133, and the drive shaft 133 is connected to the hydraulic piston 114 to move slidably the hydraulic piston 114 in the cylinder block 111.

Explaining the above operations again, as displacement occurs in the brake pedal 10, the signal detected by the pedal displacement sensor 11 is transmitted to the ECU, and the ECU operates the motor 120 in one direction to rotate the worm shaft 131 in one direction. The rotational force of the worm shaft 131 is transmitted to the drive shaft 133 via the worm wheel 132, and the hydraulic piston 114 connected to the drive shaft 133 moves forward to generate hydraulic pressure in the first pressure chamber 112.

Conversely, when the pedal effort is removed from the brake pedal 10, the ECU drives the motor 120 in the opposite direction to rotate the worm shaft 131 in the opposite direction. Accordingly, the worm wheel 132 also rotates in the opposite direction and the hydraulic piston 114 connected to the drive shaft 133 returns (moves backward) to generate negative pressure in the first pressure chamber 112.

Meanwhile, the generation of hydraulic pressure and negative pressure is also possible in the opposite direction to the above. In other words, as displacement occurs in the brake pedal 10, the signal detected by the pedal displacement sensor 11 is transmitted to the ECU (not shown), and the ECU drives the motor 120 in the opposite direction to rotate the worm shaft 131 in the opposite direction. The rotational force of the worm shaft 131 is transmitted to the drive shaft 133 via the worm wheel 132, and the hydraulic piston 114 connected to the drive shaft 133 moves backward to generate hydraulic pressure in the second pressure chamber 113.

Conversely, when the pedal effort is removed from the brake pedal 10, the ECU drives the motor 120 in one direction to rotate the worm shaft 131 in one direction. Accordingly, the worm wheel 132 also rotates in the opposite direction and the hydraulic piston 114 connected to the drive shaft 133 returns (moves forward) to generate negative pressure in the second pressure chamber 113.

As such, the hydraulic pressure supply device 100 serves to transmit hydraulic pressure to the wheel cylinders 40 in response to the rotation direction of the rotational force generated from the motor 120. In the case of the motor 120 rotates in one direction, when hydraulic pressure is generated in the first pressure chamber 112, negative pressure may be generated in the second pressure chamber 113, but the negative pressure is released by being transmitted the hydraulic pressure from the reservoir 30 to the second pressure chamber 113 through the second dump flow path 117. Even when the motor 120 rotates in the other direction, the release operation of the negative pressure in the first pressure chamber 112 is the same.

Although not shown in the drawings, the power conversion unit 130 may be configured as a ball screw nut assembly. For example, the power conversion unit 130 may include a screw formed integrally with the rotation shaft of the motor 120 or connected to rotate together with the rotation shaft of the motor 120, a ball nut screwed with the screw in a state of limited rotation and moves linearly according to the rotation of the screw. The hydraulic piston 114 is connected to the ball nut of the power conversion unit 130 to press the pressure chamber by the linear motion of the ball nut. The structure of such a ball screw nut assembly is a well-known technology as a device for converting a rotational motion into a linear motion, so a detailed description thereof will be omitted.

Furthermore, it should be understood that the power conversion unit 130 according to the embodiment of the disclosure may be employed in any structure as long as it may convert a rotational motion into a linear motion in addition to the structure of the above-described ball screw nut assembly.

On the other hand, the electronic brake system 1 according to the embodiment may further include first and second backup flow paths 251 and 252.

The first backup flow path 251 may connect the first hydraulic port 24a and the first hydraulic circuit 201, and the second backup flow path 252 may connect the second hydraulic port 24b and the second hydraulic circuit 202. Furthermore, the first cut valve 261 for controlling the flow of oil may be provided in the first backup flow path 251, and the second cut valve 262 for controlling the flow of oil may be provided in the second backup flow path 252.

The first and second cut valves 261 and 262 may be provided as a normal open type solenoid valve that opened in a normal state and operates to be closed the valve when a closing signal is received from the ECU.

Next, the hydraulic control unit 200 according to the embodiment of the disclosure will be described.

The hydraulic control unit 200 may include the first hydraulic circuit 201 and the second hydraulic circuit 202 so as to receive hydraulic pressure and assign and control two wheels, respectively. For example, the first hydraulic circuit 201 may control the RR and the RL wheels, and the second hydraulic circuit 202 may control the FR and the FL wheels. The wheel cylinders 40 are installed on each of the wheels FR, FL, RR, and RL to receive hydraulic pressure from the hydraulic pressure supply device 100 to perform braking.

The first hydraulic circuit 201 is connected to the second hydraulic flow path 215 and the fifth hydraulic flow path 216 to receive hydraulic pressure from the hydraulic pressure supply device 100.

Similarly, the second hydraulic circuit 202 is connected to the sixth hydraulic flow path 217, the third hydraulic flow path 213, and the seventh hydraulic flow path 218 to receive hydraulic pressure from the hydraulic pressure supply device 100.

The first and second hydraulic circuits 201 and 202 may include a plurality of inlet valves 221, 221a, 221b, 221c, and 221d to control the flow of hydraulic pressure. For example, the first hydraulic circuit 201 may be provided with two inlet valves 221a and 221b for respectively controlling the hydraulic pressure transmitted to the two wheel cylinders 40. Furthermore, the second hydraulic circuit 202 may be provided with two inlet valves 221c and 221d for respectively controlling the hydraulic pressure transmitted to the wheel cylinders 40. Herein, the inlet valves 221 are disposed on the upstream side of the wheel cylinders 40 adjacent to the hydraulic pressure providing unit 110, and are provided as a normal open type solenoid valve that opened in a normal state and operates to be closed the valve when a closing signal is received from the ECU.

Furthermore, the first and second hydraulic circuits 201 and 202 may include check valves 223a, 223b, 223c, and 223d provided in bypass flow paths connecting front and rear sides of each inlet valve 221a, 221b, 221c, and 221d. The check valves 223a, 223b, 223c, and 223d may be provided to allow only the flow of oil from the wheel cylinders 40 toward the hydraulic pressure providing unit 110, and restrict the flow of oil from the hydraulic pressure providing unit 110 toward the wheel cylinders 40.

Furthermore, to improve performance when braking is released, the first and second hydraulic circuits 201 and 202 may further include a plurality of outlet valves 222, 222a, 222b, 222c, and 222d. The outlet valves 222 are respectively connected to the wheel cylinders 40 to control the hydraulic pressure to exit from the respective wheels RR, RL, FR, and FL. In other words, the outlet valves 222 detect braking pressure of each wheel RR, RL, FR, and FL, and is selectively opened when pressure reduction braking is required to control the pressure. The outlet valves 222 may be provided as a normal closed type solenoid valve that closed in a normal state and operates to open the valve when an open signal is received from the ECU.

On the other hand, the hydraulic control unit 200 may be connected to the backup flow paths 251 and 252. For example, the first hydraulic circuit 201 may be connected to the first backup flow path 251 to receive hydraulic pressure from the master cylinder 20, and the second hydraulic circuit 202 may be connected to the second backup flow path 252 to receive hydraulic pressure from the master cylinder 20.

The first back-up flow path 251 may join the first hydraulic circuit 201 at the upstream side of the first and second inlet valves 221a and 221b (at the on the hydraulic pressure providing unit side). Similarly, the second backup flow path 252 may join the second hydraulic circuit 202 at the upstream side of the third and fourth inlet valves 221c and 221d. Accordingly, when the first and second cut valves 261 and 262 are closed, the hydraulic pressure provided from the hydraulic pressure providing unit 110 may be supplied to the wheel cylinders 40 through the first and second hydraulic circuits 201 and 202, and when the first and second cut valves 261 and 262 are opened, the hydraulic pressure provided from the master cylinder 20 may be supplied to the wheel cylinders 40 through the first and second backup flow paths 251 and 252. At this time, the plurality of inlet valves 221a, 221b, 221c, and 221d maintain an open state, so it is not necessary to switch the operating state.

On the other hand, unexplained reference numerals PS1-1 and PS1-2 are hydraulic flow path pressure sensors for detecting the hydraulic pressure of the first and second hydraulic circuits 201 and 202, and PS2 is a backup flow path pressure sensor for measuring the oil pressure of the master cylinder 20. Furthermore, MPS is a motor control sensor for controlling the rotation angle of the motor 120 or the current of the motor. Only one PS1-1 and PS1-2 may be provided.

Thereafter, the operation of the electronic brake system 1 according to the embodiment of the disclosure will be described in detail.

Hereinafter, the operation of the electronic brake system 1 according to the embodiment of the disclosure will be described in detail.

When braking of the electronic brake system 1 is normally performed, regenerative braking cooperative control is additionally possible. The regenerative braking cooperative control method will be described later.

When braking by the driver is started, a required braking amount of the driver may be detected through information such as the pressure of the brake pedal 10 in which the driver steps through the pedal displacement sensor 11. The ECU receives an electrical signal output from the pedal displacement sensor 11 and drives the motor 120.

Furthermore, the ECU 510 receives the size of the regenerative braking amount through the backup flow path pressure sensor PS2 provided on an outlet side of the master cylinder 20 and the first and second hydraulic flow path pressure sensors PS11 and PS12 provided in the first and second hydraulic circuits 201 and 202 and calculates the size of the friction braking amount according to the difference between the driver's required braking amount and the regenerative braking amount, thereby grasping increasing or decreasing the pressure of the wheel cylinders 40.

Specifically, when the driver depresses on the brake pedal 10 at the beginning of braking, the motor 120 operates, and the rotational force of the motor 120 is transmitted to the hydraulic pressure providing unit 110 by the power conversion unit 130, and the hydraulic pressure discharged from the hydraulic pressure providing unit 110 is transmitted to the first hydraulic flow path 211.

In particular, when the hydraulic piston 114 moves forward, the hydraulic pressure discharged from the hydraulic pressure providing unit 110 may be controlled so that the hydraulic pressure is transmitted to the second hydraulic circuit 202 while the second control valve 231 installed in the seventh hydraulic flow path 218, which is branched from the first hydraulic flow path 211, is opened, and may be controlled so that the hydraulic pressure is transmitted to the first hydraulic circuit 201 while the first control valve 231 installed in the second hydraulic flow path 218 is also opened.

Meanwhile, when the hydraulic piston 114 moves backward, the hydraulic pressure discharged from the hydraulic pressure providing unit 110 may be controlled so that the hydraulic pressure is transmitted to the first hydraulic circuit 201 while the fourth control valve 233 installed in the fifth hydraulic flow path 216, which is branched from the fourth hydraulic flow path 214, is opened, and may be controlled so that the hydraulic pressure is transmitted to the second hydraulic circuit 202 through the first control valve 232 installed in the sixth hydraulic flow path 217.

On the other hand, when the hydraulic pressure supply device 100 generates hydraulic pressure, the first and second cut valves 261 and 262 installed in the first and second backup flow paths 251 and 252 connecting to the first and second hydraulic ports 24a and 24b of the master cylinder 20 are closed, so that hydraulic pressure discharged from the master cylinder 20 is not transmitted to the wheel cylinders 40.

Furthermore, the hydraulic pressure discharged from the hydraulic pressure supply device 100 is transmitted to the wheel cylinders 40 installed in each wheel RR, RL, FR, and FL as the inlet valves 221 are opened to generate braking force. At this time, when the pressure transmitted to the first and second hydraulic circuits 201 and 202 is measured to be higher than a target pressure value according to the pedal effort of the brake pedal 10, the release valve 233 is opened to be controlled to follow the target pressure value.

On the other hand, the pressure generated according to the pressure of the master cylinder 20 in response to the pedal effort of the brake pedal 10 is transmitted to the simulation device 50 connected to the master cylinder 20. At this time, the normally closed simulator valve 54 disposed at the rear end of the simulation chamber 51 is opened, and the oil filled in the simulation chamber 51 through the simulator valve 54 is transmitted to the reservoir 30. Furthermore, the reaction force piston 52 moves and a pressure corresponding to the load of the reaction force spring 53 supporting the reaction force piston 52 is formed in the simulation chamber 51 to provide an appropriate pedal feel to the driver.

In the above, the circuit diagram of the electronic brake system 1 according to the disclosure has been described.

Hereinafter, the operation of hydraulic control of the circuit when a leak occurs in the first hydraulic circuit 201 or the second hydraulic circuit 202 will be described.

In the embodiment, the first hydraulic circuit 201 includes the rear wheels RL and RR, and the second hydraulic circuit 202 includes the front wheels FL and FR. Accordingly, when a leak occurs in the first hydraulic circuit 201 and when a leak occurs in the second hydraulic circuit 202, the hydraulic pressure is transmitted to each cylinder by a different control method.

Hereinafter, in FIG. 2, a circuit state in the case where a leak occurs in the second hydraulic circuit 202 including the front wheels FL and FR will be described, and in FIG. 3, a circuit state in the case where a leak occurs in the first hydraulic circuit 201 including the rear wheels RL and RR will be described.

Figure 2:
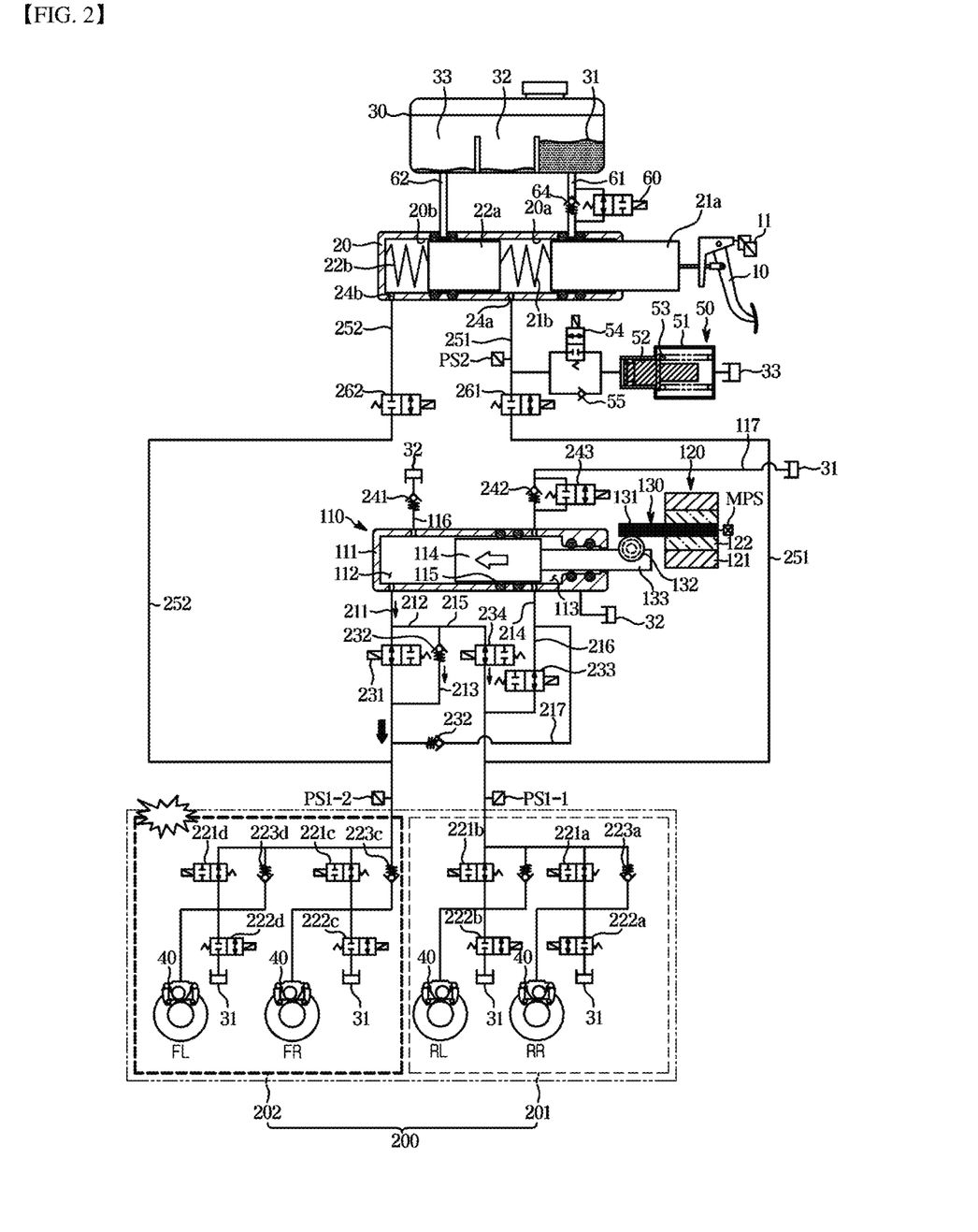
FIG. 2 is a hydraulic circuit diagram illustrating a circuit state when a leak occurs in a circuit including a front wheel of the electronic brake system according to the embodiment.

In FIG. 2, it is assumed that a minute leak occurs in the second hydraulic circuit 202. When a leak occurs inside the second hydraulic circuit 202, the hydraulic pressure flowing into the second hydraulic circuit 202 may not secure a required pressurization amount, so that the hydraulic pressure is continuously discharged through the first hydraulic flow path 211.

In other words, the hydraulic pressure of the first pressure chamber 112 is discharged through the first hydraulic flow path 211, and when the hydraulic piston 114 advances the hydraulic pressure thereof continuously passes through the first hydraulic flow path 211 to transmit to the first and second hydraulic circuits 201 and 202.

However, FIG. 2 shows in the case when a leak occurs in the second hydraulic circuit 202. When the wheel pressure measured by the PS1-2 pressure sensor does not secure the required braking amount, there may be a problem in that the hydraulic pressure is continuously discharged through the first hydraulic flow path 211.

Accordingly, the hydraulic pressure of the second and third chambers 32 and 33 of the reservoir 30 is both lost, so that the hydraulic piston 114 loses the pressurization function due to the forward movement. However, all of the hydraulic pressure discharged from each cylinder 40 returns to the first chamber 31 of the reservoir 30.

At this time, when the hydraulic piston 114 of the electronic brake system performs a reverse control (moving in the opposite direction to the arrow shown in FIG. 2), when the ABS is operated only with the rear wheels RL and RR, after all of oil are returned to the first chamber 31 of the reservoir 30 during the ABS operation, the oil is again supplied to the second chamber 32.

Accordingly, even when a leak occurs in the second hydraulic circuit 202, the pressurization performance may be maintained without loss of a liquid (oil) amount.

Figure 3:
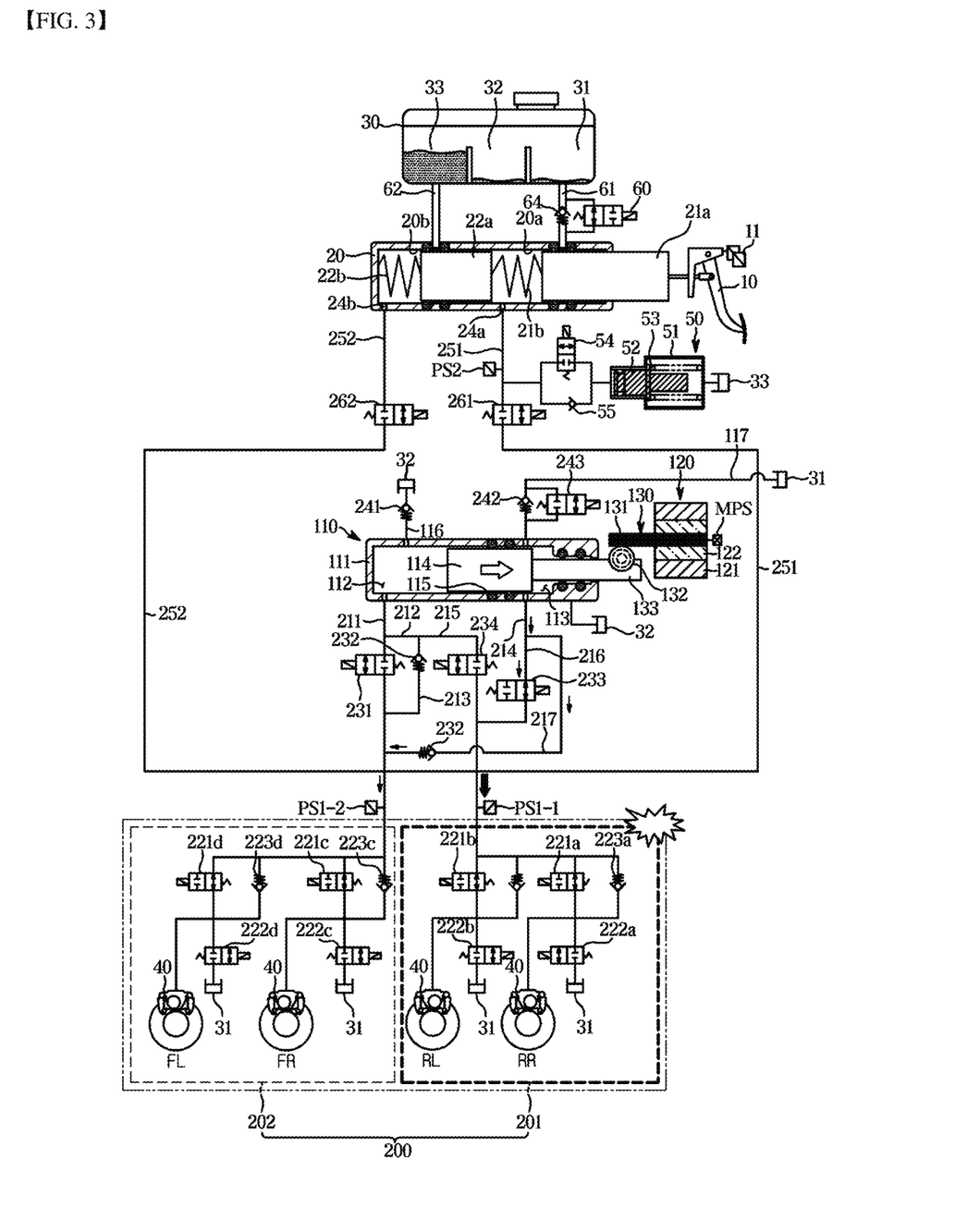
FIG. 3 is a hydraulic circuit diagram illustrating a circuit state when a leak occurs in a circuit including a rear wheel of the electronic brake system according to the embodiment.

In the contrast, FIG. 3 describes a circuit state in the case where a leak occurs in the first hydraulic circuit 201 including the rear wheels RL and RR.

As shown in FIG. 3, it is assumed that a minute leak occurs in the first hydraulic circuit 201. When a leak occurs inside the first hydraulic circuit 201, the hydraulic pressure flowing into the first hydraulic circuit 201 may not secure the required pressurization amount.

For example, when the hydraulic piston 114 moves forward, the hydraulic pressure thereof continuously passes through the first hydraulic flow path 211 to transmit to the first hydraulic circuit 201 through the second hydraulic flow path 215.

However, FIG. 3 shows a circuit diagram in the case when a leak occurs in the first hydraulic circuit 201 or in the case when the hydraulic piston 114 is controlled to move backward. When the hydraulic piston 114 is controlled to move backward, the hydraulic pressure is transmitted to the first hydraulic circuit 201 through the fourth hydraulic flow path 214, and to the second hydraulic circuit 202 passing through the sixth hydraulic flow path 217.

However, in the case when a leak occurs in the first hydraulic circuit 201, when the wheel pressure measured by the PS1-1 pressure sensor does not secure the required braking amount, there may be a problem in that the hydraulic pressure is continuously discharged through the fourth hydraulic flow path 214.

Accordingly, the hydraulic pressure of the first and second chambers 31 and 32 of the reservoir 30 is both lost, so that the hydraulic piston 114 loses the pressurization function due to the forward movement as well as the pressurization function due to the backward movement. However, all of the hydraulic pressure discharged from each cylinder 40 returns to the first chamber 31 of the reservoir 30.

At this time, the electronic brake system enters a fallback mode in order to secure the minimum braking pressure with only the front wheels. Hereinafter, a circuit operation state when entering the fallback mode will be described with reference to FIG. 4.

Figure 4:
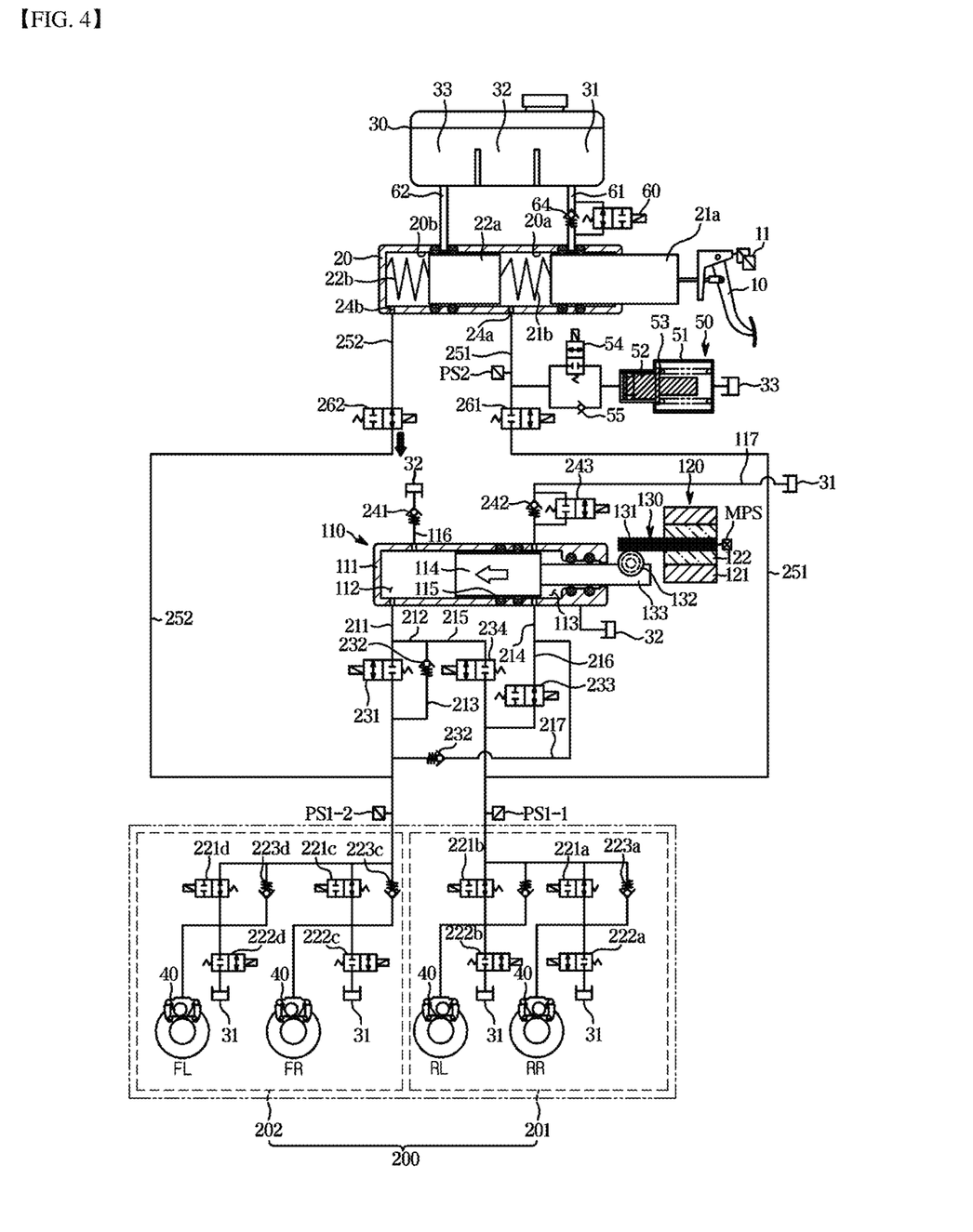
FIG. 4 is a hydraulic circuit diagram illustrating a fallback control of the electronic brake system according to the embodiment.

FIG. 4 shows a state in which a leak occurs in the first hydraulic circuit 201, braking is performed only with the wheels FR and FL. In other words, because the fallback mode has been entered, the second cut valve 262 is opened so that the hydraulic pressure is directly transmitted from the master cylinder 20 to the second hydraulic circuit 202.

Accordingly, the minimum braking pressure of the front wheels FR and FL included in the second hydraulic circuit 202 may be satisfied.

While the disclosure has been particularly described with reference to exemplary embodiments, it should be understood by those of skilled in the art that various changes in form and details may be made without departing from the spirit and scope of the present disclosure.

The invention claimed is:

1. An electronic brake system, comprising:
    a reservoir having a plurality of partitioned reservoir chambers for storing oil, the plurality of partitioned reservoir chambers comprises a first reservoir chamber, a second reservoir chamber and a third reservoir chamber;
    a master cylinder connected to the reservoir, the master cylinder including first and second master chambers and first and second pistons provided in each master chamber, to discharge oil according to a pedal effort of a brake pedal;
    a hydraulic pressure supply device operated by an electrical signal to generate hydraulic pressure and including first and second pressure chambers and a hydraulic piston;
    a first hydraulic circuit configured to transmit hydraulic pressure discharged from the hydraulic pressure supply device to wheel cylinders of left front and right front wheels; and
    a second hydraulic circuit configured to transmit hydraulic pressure discharged from the hydraulic pressure supply device to wheel cylinders of left rear and right rear wheels;
    wherein hydraulic pressure returned from the wheel cylinders and hydraulic pressure returned from the second pressure chamber of the hydraulic pressure supply device flow into the first reservoir chamber among the plurality of partitioned reservoir chambers, wherein the hydraulic pressure returned from the second pressure chamber flows into the first reservoir chamber by a dump flow path.

2. The electronic brake system of claim 1, wherein the first reservoir chamber is connected to supply the oil to the first master chamber, the second reservoir chamber is connected to supply the oil to the hydraulic pressure supply device, and the third reservoir is connected to supply the oil to the second master chamber.

3. The electronic brake system of claim 2, wherein the hydraulic pressure returned from the wheel cylinders flows into the third-first reservoir chamber.

4. The electronic brake system of claim 3, wherein when the hydraulic piston is moved backward and an anti-lock brake (ABS) of the left rear wheel and the right rear wheel is operated, the hydraulic pressure returned from the wheel cylinders is supplied from the first reservoir chamber to the second reservoir chamber.

5. The electronic brake system of claim 4, wherein when a leak occurs in the first hydraulic circuit, the hydraulic piston moves to generate braking pressure.

6. The electronic brake system of claim 3, wherein when a leak occurs in the second hydraulic circuit, the electronic brake system enters a fallback mode.

7. The electronic brake system of claim 6, further comprising:
    a first backup flow path configured to directly transmit the hydraulic pressure from the master cylinder to the first hydraulic circuit; and
    a second backup flow path configured to directly transmit the hydraulic pressure from the master cylinder to the second hydraulic circuit.

8. The electronic brake system of claim 7, wherein when a leak occurs in second hydraulic circuit, the hydraulic pressure generated in the master cylinder is transmitted to the left front wheel and the right front wheel through the first backup flow path.

9. The electronic brake system of claim 8, further comprising
    a first cut valve installed in the first backup flow path and a second cut valve installed in the second backup flow path; wherein
    when a leak occurs in the second hydraulic circuit, the electronic brake system opens the first cut valve.

10. The electronic brake system of claim 1, wherein the electronic brake system is configured to perform independent regenerative braking of the first hydraulic circuit or the second hydraulic circuit.

11. The electronic brake system of claim 1, further comprising:
    a first backup flow path configured to transmit the hydraulic pressure from the master cylinder to the first hydraulic circuit;
    a second backup flow path configured to transmit the hydraulic pressure from the master cylinder to the second hydraulic circuit;
    a first cut valve installed in the first backup flow path and a second cut valve installed in the second backup flow path.

* * * * *